United States Patent Office 3,449,321
Patented June 10, 1969

3,449,321
ESTROGEN WATER-SOLUBLE 16α-YL-GLUCO-PYRANOSIDURONIC COMPOUNDS AND PREPARATION THEREOF
Joseph Peter Joseph, Cliffside Park, N.J., and John Paul Dusza, Nanuet, and Seymour Bernstein, New City, N.Y., assignors to American Cyanamid Company, Stamford, Conn., a corporation of Maine
No Drawing. Filed Mar. 28, 1967, Ser. No. 626,419
Int. Cl. C08b 19/00
U.S. Cl. 260—210.5                                 4 Claims

ABSTRACT OF THE DISCLOSURE

A chemical method for preparing novel crystalline estrogen water-soluble mixed conjugates starting either from 3-benzyloxy - 16α-hydroxyestra-1,3,5(10)-trien-17-one or 3,16,17β - trihydroxyestra - 1,3,5(10)-triene and reacting with a protected halo glucuronic acid followed by preferential de-blocking and subsequent sulfation at the 3-position to produce the metallic or ammonium salts of the mixed conjugate, 17β-hydroxy-3-sulfooxy-estra-1,3,5(10)-trien-16α-yl - glucopyranosiduronic acid. The compounds are useful as hypocholesterolemic agents.

BACKGROUND OF THE INVENTION

Field of the invention

The invention relates to sugar and sulfuric acid derivatives of estrogen type steroids.

Description of the prior art

The following compound in di-anionic form but not isolated is described by structure in Steroids, 6, 553 (1965) by M. Levitz et al.

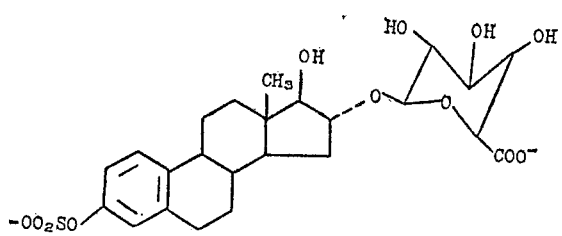

While this compound has been reported in the literature as occurring in fluids of the human body, it has neither been chemically synthesized nor isolated in crystalline form prior to this invention. The compound and its salts, therefore, are novel crystalline compounds having a definite melting point and capable of commercial manufacture and use. Some intermediates useful in its synthesis have been described.

BRIEF SUMMARY OF THE INVENTION

This invention relates to novel crystalline estrogen water-soluble conjugates and to methods for their production. Additionally, the invention relates to a novel method for the production of 17β-hydroxy-3-sulfooxyestra-1,3,5(10)-trien-16α-yl-glucopyranosiduronic acid dipotassium salt.

More particularly, the invention relates to crystalline compounds represented by the following general formula:

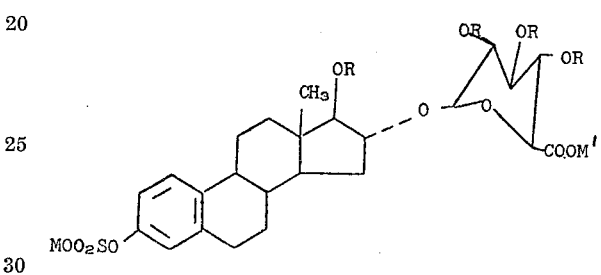

wherein M and M' are selected rfom the group consisting of ammonium, triloweralkyl ammonium, potassium, and sodium, R is selected from the group consisting of hydrogen and lower alkanoyl and when R is lower alkanoyl, M' is methyl.

The novel compounds of this invention are, in general, white crystalline solids, freely soluble in water and relatively insoluble in the more common organic solvents, as for example, ether, petroleum ether, and the like. The novel crystalline compounds of the present invention, as described above, as well as the particular compound 17β-hydroxy - 3 - sulfooxyestra-1,3,5(10)-trien-16α-yl-glucopyranosiduronic acid dipotassium salt are prepared from either of two starting compounds: 3-benzyloxy-16α-hydroxyestra-1,3,5(10) - trien - 17-one or 3,16α,17β-trihydroxyestra-1,3,5(10)-triene. The preparation of 3-benzyloxy-16α-hydroxyestra-1,3,5(10)-trien-17-one is described by J. Elce, et al., in Biochem. J., 91, 30P (1964). The other starting material, 3,16α,17β-trihydroxyestra - 1,3,5 (10)-triene (estriol), is a known compound and readily available commercially. The preparation of methyl (1-bromo-2,3,4-tri-O-acetyl-β-D-glucopyranosid)uronate, the blocked sugar used in the synthesis of the compounds of this invention, is described by G. N. Bollenback et al., in the J. Am. Chem. Soc., 77, 3310 (1955), and by M. F. Goebel and F. N. Babers, J. Biol. Chem., 106, 63 (1934). The sequence of reactions leading to the novel products of this invention is given in the flow chart directly following.

FLOW CHART

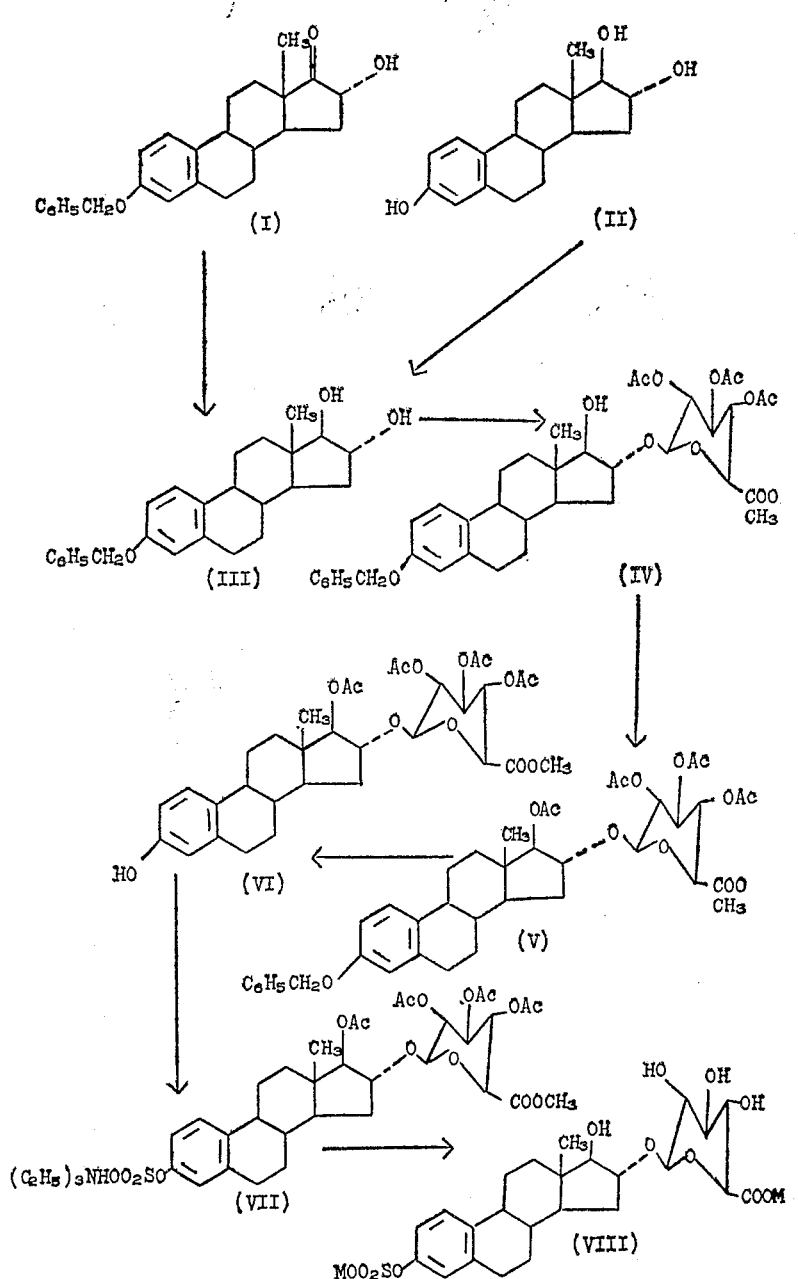

wherein M is as previously described, and Ac is lower alkanoyl.

As indicated in the Flow Chart, condensation of methyl(1α-bromo-2,3,4-tri - O - acetyl-β-D-glucopyranosid)uronate with estriol-3-benzyl ether (III) gives methyl (3-benzyloxy - 17β - hydroxyestra-1,3,5(10)-trien-16α-yl-2',3',4'-tri - O - acetyl-β-D-glucopyranosid)uronate (IV). Acetylation of the 17β-hydroxy group followed by debenzylation at the 3-position carbon atoms affords methyl-(17β-acetoxy - 3 - hydroxyestra-1,3,5(10)-trien-16α-yl-2',3',4-tri - O - acetyl-β-D-glucopyranosid)uronate (VI). Sulfation of the aromatic hydroxyl group at the 3-position carbon with triethylamine-sulfur trioxide gives (VII) which on base hydrolysis of the ester groups on the sugar moiety leaves the metallic or ammonium salts of the mixed conjugate, 17β-hydroxy-3-sulfooxyestra-1,3,5(10)-trien-16α-yl-glucopyranosiduronic acid (VIII).

It is to be noted that this invention provides a relatively straight forward chemical method for obtaining 17β-hydroxy - 3 - sulfooxyestra-1,3,5(10)-trien-16α-yl-glucopyranosiduronic acid dipotassium salt. The presence of this compound (in a di-anionic form without specification of the cation) in various body fluids of humans, as for example, in maternal blood at term, together with an enzymatic sulfurylation method of synthesis has been reported by M. Levitz, J. Katz, and G. H. Twombly in Steroids, 6, 553 (1965). No chemical method for obtaining this compound in a crystalline useful form was available prior to this invention.

The compounds of the present invention are physiologically active in lowering blood cholesterol in warm-blooded animals, such as rats. They are therefore useful as hypocholesterolemic agents.

DETAILED DESCRIPTION

The invention will be described in more detail in conjunction with the following examples.

Example 1.—Preparation of 3-benzyloxy-16α,17β-dihydroxyestra-1,3,5(10)-triene (III)

In a mixture of 10 ml. of freshly distilled tetrahydrofuran and 10 ml. of ethanol, 200 mg. of 3-benzyloxy- 16α-hydroxyestra-1,3,5(10)-trien-17-one is dissolved and cooled to 2° C. To this solution is added 200 mg. of sodium borohydride and after 15 minutes the reaction is terminated with acetic acid. Evaporation of the reaction mixture to dryness under reduced pressure leaves a glass-like residue which is dissolved in methylene chloride. The methylene chloride solution is washed with water and dried with anhydrous sodium sulfate. Removal of the solvent leaves a glass residue from which 3-benzyloxy-16α-dihydroxyestra-1,3,5(10)-triene (trivial name is estriol-3-benzyl ether) is isolated by preparative thin layer chromatography on silica gel absorbant. Crystallization of this material from a mixture of acetone-hexane yields the product as white crystals, melting point 145–146° C.

Example 2.—Alternate method for the preparation of 3-benzyloxy-16α,17β-dihydroxyestra - 1,3,5(10)triene (III)

In 250 ml. of absolute ethanol, 5.0 g. of estriol is suspended together with 11.5 g. of potassium carbonate and 10 ml. of benzyl chloride. The mixture is refluxed for a period of 2 hours after which time nearly all of the solvent is removed and water is added. The resultant gummy residue is dissolved in methylene chloride and the solution is filtered through hydrous magnesium silicate. An additional amount of methylene chloride is used as a wash and the filtrates are combined. The solvent is removed under reduced pressure and the residue, a gum, is dissolved in a minimum amount of ether. On cooling, 3-benzyloxy - 16α,17β - dihydroxyestra-1,3,5(10)-triene separates as a crystalline solid.

Example 3.—Preparation of methyl (3-benzyloxy-17β-hydroxyestra - 1,3,5(10) - trien-16α-yl-2′,3′,4′-tri-O-acetyl-β-D-glucopyranosid)uronate (V)

To a stirred solution of 4.6 g. of 3-benzyloxy-16α,17β-dihydroxyestra-1,3,5(10)-triene (obtained as described in Example 1 or 2) in 200 ml. of benzene is added 3.6 g. of silver carbonate. Approximately 50 ml. of benzene is distilled off and 5.1 g. of methyl (1α-bromo-2,3,4-tri-O-acetyl-β-D-glucopyranosid)uronate in 75 ml. of dry benzene is added to the mixture with stirring over a period of 1 hour. This mixture is refluxed for 2 hours with stirring, and is then cooled and filtered. Evaporation of the filtrate under reduced pressure yields a gum-like residue. The latter is dissolved in anhydrous ether and allowed to stand for two days at 5° C. White, crystalline methyl (3-benzyloxy-17β-hydroxyestra-1,3,5-(10)-trien-16α-yl-2′,3′,4′-tri-O-acetyl-β-D-glucopyranosid)uronate is formed and obtained by filtration. Recrystallization from methylene chloride-methanol yields the analytically pure product, melting point 245–246° C.

Example 4.—Preparation of methyl-(17β-acetoxy-3-benzyloxyestra - 1,3,5(10) - trien-16α-yl-2′,3′,4′-tri-O-acetyl-β-D-glucopyranosid)uronate (V)

In a mixture of 5 ml. of pyridine and 2.5 ml. of acetic anhydride, 1.0 g. of methyl (3-benzoyloxy-17β-hydroxyestra-1,3,5(10)-trien-16α-yl-2′,3′,4′-tri - O - acetyl-β-D-glucopyranosid)uronate is dissolved and allowed to remain at room temperature for 18 hours. The solution is poured into water and the product, methyl(17β-acetoxy-3-benzyloxyestra - 1,3,5(10) - triene-16α-yl-2′,2′,4′-tri-O-acetyl-β-D-glucopyranosid)uronate, a white solid, is collected by filtration. This material is recrystallized from methanol, melting point 180° C. (1. c. shrinks at 119° C.).

Example 5.—Preparation of methyl (17β-acetoxy-3-hydroxyestra - 1,3,5(10) - trien-16α-yl-2′,3′,4′-tri-O-acetyl-β-D-glucopyranosid)uronate (VI)

In 30 ml. of glacial acetic acid 1.1 g. of methyl-(17β-acetoxy - 3 - benzyloxyestra-1,3,5(10)-triene-16α-yl-2′,3′, 4′-tri-O-acetyl-β-D-glucopyranosid)uronate is dissolved 500 mg. of palladium on charcoal (10%) is added and the mixture is hydrogenated at 40 pounds per square inch for 4 hours at room temperature. The catalyst is removed by filtration and the filtrate is evaporated leaving the white crystalline solid product. On recrystallization from methanol, the product having melting point 212–213° C. is obtained.

Example 6.—Preparation of methyl-(17β-acetoxy-3-sulfooxyestra-1,3,5(10)-triene - 16α - yl-2′,3′,4′-tri-O-acetyl-β-D-glucopyranosid)-uronate triethylammonium salt (VII)

In 1 ml. of pyridine, 250 mg. of methyl-(17β-acetoxy-3-hydroxylestra-1,3,5(10)-trien - 16β - yl-2′,3′,4′-tri-O-acetyl-β-D-glucopyranosid)uronate is dissolved with 362 mg. of triethylamine sulfur trioxide. The solution is allowed to stand at room temperature for 24 hours and is then added to a portion of anhydrous ether. The resulting gum is triturated with ether two times and then dissolved in methylene chloride. This solution is filtered through hydrous magnesium silicate using additional methylene chloride as a wash. The methylene chloride is removed under reduced pressure leaving the product, methyl-(17β-acetoxy - 3 - sulfoxyestra-1,3,5(10)-trien-16α-yl-2′,3′,4′-tri-O-acetyl-β-D-glucopyranosid)uronate triethylammonium salt, crystallization from methanol-ether gives the product of the example, melting point 212–213° C. Infrared analysis shows the following absorption bands: (SO₂), 8.0–8.3μ and C-O at 9.6μ.

Example 7.—Preparation of 17β-hydroxy-3-sulfooxyestra-1,3,5(10)-triene-16α-yl-glucopyranosiduronic acid dipotassium salt (VIII)

In a mixture of 2.5 ml. of pyridine and 5.0 ml. of 12% aqueous potassium hydroxide, 237 mg. of methyl-(17β-acetoxy - 3 - sulfooxyestra-1,3,5(10)-triene-16α-yl-2′,3′,4′-tri-O-acetyl-β-D-glucopyranosid)uronate triethylammonium salt is added and the mixture agitated for 5 minutes. The pyridine layer is collected and 25 ml. of ether is added, the gummy residue is stirred, and the ether is discarded. The wash procedure is repeated twice leaving 17β-hydroxy - 3 - sulfooxyestra-1,3,5-(10)-trien-16α-yl-glucopyranosiduronic acid dipotassium salt as a white crystalline solid, melting point greater than 300° C. Infrared analysis shows the following absorption bands: SO₂, 8.0–8.2μ and C-O at 9.5μ. The structure of the compound of the example is corroborated by nuclear magnetic resonance spectral analysis.

We claim:

1. A crystalline estrogen water soluble mixed conjugate of the formula:

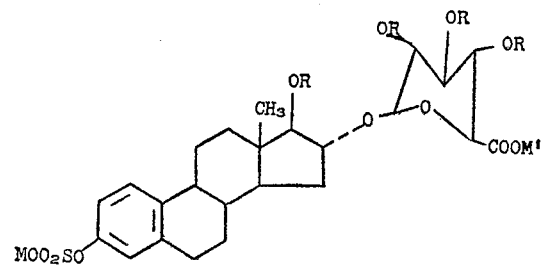

wherein M and M′ are selected from the group consisting of ammonium, triloweralkyl ammonium, potassium, and sodium, R is selected from the group consisting of hydrogen and lower alkanoyl and when R is lower alkanoyl, M′ is methyl.

2. The crystalline estrogen, methyl-(17β-acetoxy-3-sulfooxyestra-1,3,5(10)-trien - 16α - yl-2′,3′,4′-tri-O-acetyl-β-D-glucopyranosid)uronate triethylammonium salt.

3. The crystalline estrogen, 17β-hydroxy-3-sulfooxy-estra-1,3,5(10)-trien-16α-yl-glucopyranosiduronic acid dipotassium salt.

4. A method of preparing compounds of the formula:

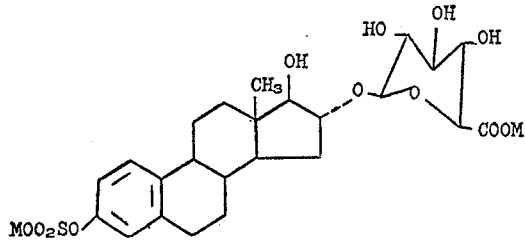

wherein M is selected from the group consisting of potassium and sodium, which comprises hydrogenating methyl-(17β-acetoxy - 3 - benzoyloxyestra-1,3,5(10)-tien-16α-yl - 2′,3′,4′ - tri - O-acetyl-β-D-glucopyranosid) uronate contacting the reaction product with triethyl-amine-sulfur trioxide and subsequently with a member of the group consisting of potassium hydroxide and sodium hydroxide and recovering the products therefrom.

References Cited

UNITED STATES PATENTS 3,275,624   3/1967   Cantrall et al. _____ 260—210.5

OTHER REFERENCES

Levitz et al.: "Steroids," vol. 6, July 1965, pp. 553–559.

LEWIS GOTTS, Primary Examiner.

JOHNNIE R. BROWN, Assistant Examiner.

U.S. Cl. X.R.

260—999